United States Patent
Goto et al.

(10) Patent No.: US 8,534,890 B2
(45) Date of Patent: Sep. 17, 2013

(54) LIGHT PIPE ASSEMBLY HAVING OPTICAL CONCENTRATOR

(75) Inventors: Kazuhiro Goto, Markham (CA); Dragos Luca, North York (CA)

(73) Assignee: Tyco Electronics Canada ULC, Markham, Ontario (CA)

( * ) Notice: Subject to any disclaimer, the term of this patent is extended or adjusted under 35 U.S.C. 154(b) by 717 days.

(21) Appl. No.: 12/574,349

(22) Filed: Oct. 6, 2009

(65) Prior Publication Data
US 2010/0091515 A1    Apr. 15, 2010

Related U.S. Application Data

(60) Provisional application No. 61/195,674, filed on Oct. 9, 2008.

(51) Int. Cl.
*G02B 6/00* (2006.01)
(52) U.S. Cl.
USPC .......................... 362/551; 362/552; 362/581
(58) Field of Classification Search
USPC ............ 362/551, 552, 581, 582, 555; 385/33
See application file for complete search history.

(56) References Cited

U.S. PATENT DOCUMENTS

| | | | |
|---|---|---|---|
| 4,767,172 A * | 8/1988 | Nichols et al. | 385/146 |
| 4,770,514 A | 9/1988 | Silverglate | |
| 4,883,333 A * | 11/1989 | Yanez | 385/33 |
| 5,218,480 A | 6/1993 | Moskovich | |
| 5,757,557 A | 5/1998 | Medvedev et al. | |
| 5,833,355 A | 11/1998 | You et al. | |
| 5,860,723 A * | 1/1999 | Domas et al. | 362/346 |
| 6,280,035 B1 | 8/2001 | Tadic-Galeb et al. | |
| 6,443,594 B1 | 9/2002 | Marshall et al. | |
| 6,612,729 B1 | 9/2003 | Hoffman | |
| 6,724,543 B1 | 4/2004 | Chinniah et al. | |
| 6,746,124 B2 | 6/2004 | Fischer et al. | |
| 6,937,791 B2 * | 8/2005 | Guy | 385/33 |
| 7,077,525 B2 | 7/2006 | Fischer et al. | |
| 7,106,936 B2 | 9/2006 | Saccomanno | |
| 7,159,997 B2 | 1/2007 | Reo et al. | |
| 7,344,902 B2 | 3/2008 | Basin et al. | |
| 2004/0218858 A1 | 11/2004 | Guy | |
| 2006/0146531 A1 | 7/2006 | Reo et al. | |
| 2006/0146540 A1 | 7/2006 | Reo et al. | |
| 2007/0076427 A1 | 4/2007 | Reo et al. | |
| 2008/0048200 A1 | 2/2008 | Mueller et al. | |

OTHER PUBLICATIONS

International Search Report, International Application No. PCT/US2009/005504, International Filing Date Jul. 10, 2009.
LUXEON® Collimator LXHL-NX05; Power Light Source, Philips; Copyright 2006 LUMILEDS Lighting, 4 pgs.
Customer Drawing, Carclo Technical Plastics, © 2007 Carclo All Dimensions in mm.
ENERGY STAR® Program Requirements for Solid State Lighting Luminaires, Final Draft Sep. 12, 2007, 22 pgs.

* cited by examiner

*Primary Examiner* — Thomas Sember

(57) ABSTRACT

A light pipe assembly includes a light pipe and an optical concentrator. The light pipe is elongated between opposite ends along a longitudinal axis. The light pipe is formed from a light transmissive material. The optical concentrator is joined to the first end of the light pipe and includes an end section and an opposite coupling end connected to the first end of the light pipe. The end section is configured to receive light generated by a light source. The optical concentrator is formed from a light transmissive material that conveys light through the optical concentrator. The optical concentrator focuses the light generated by the light source into the first end of the light pipe.

12 Claims, 9 Drawing Sheets

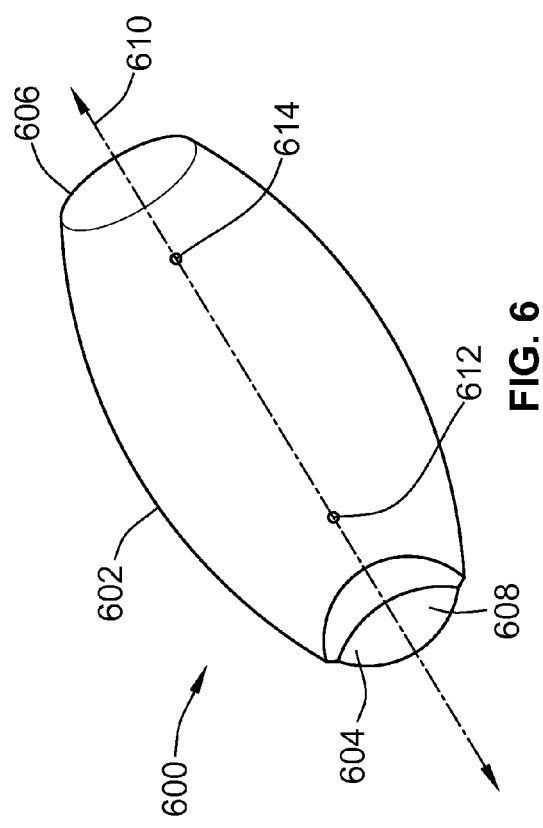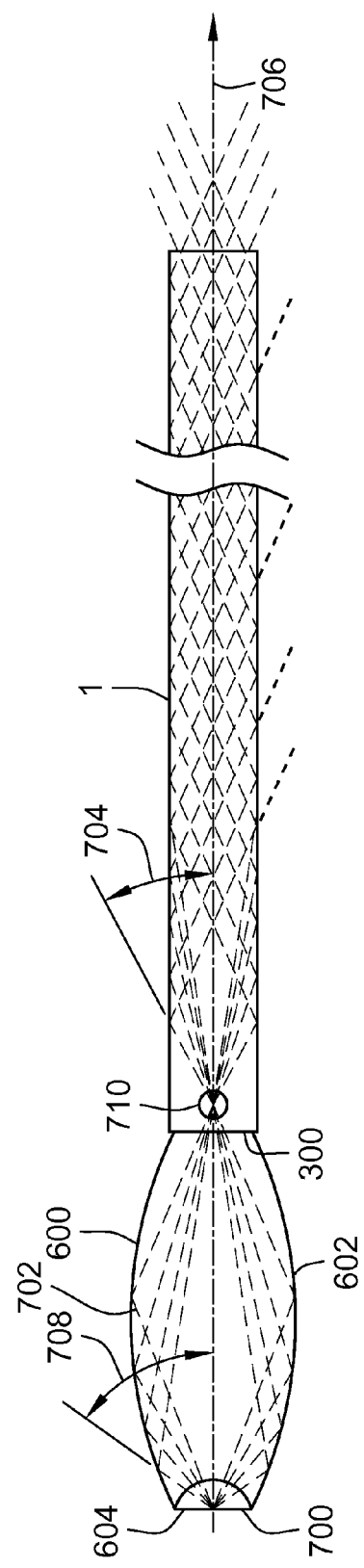

LIGHT PIPE ASSEMBLY HAVING OPTICAL CONCENTRATOR

CROSS-REFERENCE TO RELATED APPLICATIONS

This application claims the benefit of U.S. Provisional Patent Application No. 61/195,674, entitled "Light Pipe Having Optical Concentrator," and filed Oct. 9, 2008 (the "'674 Application"). The entire subject matter of the '674 Application is incorporated by reference herein in its entirety.

BACKGROUND OF THE INVENTION

The present invention relates generally to light pipes and, more particularly, to a light pipe having an optical concentrator.

Current lighting applications such as automobile interior ambient lighting use a light pipe with a light source such as a light emitting diode (LED). Surface mount LEDs tend to have a wide projection angle. For example, an LED may emit light generally along an optical axis extending away from the LED. The light may be bounded by a cone extending away from the LED. The cone is bounded by a viewing angle in one or more planes that extend through the optical axis. For example, the optical axis may be located within the plane(s) in which the viewing angle of the light is measured. The viewing angle can represent the widest distribution of the light emitted by the LED.

Some known LEDs emit light in relatively large viewing angles. In LEDs that are coupled with one of the ends of a light pipe, the large viewing angles may be sufficiently large that a significant portion of the light emitted by the LEDs does not enter into the end of the light pipe. Instead, this portion of the light exits into the surrounding atmosphere.

Optical concentrators are available that comprise lenses having various shaped surfaces to collect or collimate and focus light from a light source. For example, U.S. Pat. No. 5,757,557 provides a beam-forming lens of generally conical shape made of transparent material. The lens has a cylindrical symmetry about the axis of rotation that forms the optical axis of the output beam. The lens includes a generally cylindrical internal cavity in which a light source is placed. The sidewall of the cylindrical cavity refracts light away from the optical axis, while the end wall of the cylindrical cavity refracts light toward the optical axis. The sideways going light strikes the curved outer wall of the lens and is reflected forwardly toward the exit face. The forward going light is collimated by a bulge on the upper surface of the lens. The exit face of the lens is either planar or convex. This lens is limited to a light source placed within a cavity to collimate the light rays transmitted from the light source.

U.S. Pat. No. 6,724,543 discloses another lens assembly for use with various light emitting sources. The lens assembly includes a central section and an outer section. The central section is radially centered on an optical axis. The outer section radially surrounds the central section and is centered on the optical axis. The outer section has a generally rotated parabolic shaped outer wall, an inner wall that abuts the central section, and a slanted front surface that extends between the inner wall and the outer wall. However, the lens assembly requires the formation of shapes or surfaces on the light exit end to provide the required light collimating.

A need exists for a light pipe assembly that focuses or collimates light generated by a light source such that the amount of light entering a light pipe from the light source is increased and that degradation of the light as the light travels along the light pipe is reduced.

BRIEF DESCRIPTION OF THE INVENTION

In one embodiment, a light pipe assembly is provided. The assembly includes a light pipe and an optical concentrator. The light pipe is elongated between opposite ends along a longitudinal axis. The light pipe is formed from a light transmissive material. The optical concentrator is joined to the first end of the light pipe and includes an end section and an opposite coupling end connected to the first end of the light pipe. The end section is configured to receive light generated by a light source. The optical concentrator is formed from a light transmissive material that conveys light through the optical concentrator. The optical concentrator focuses the light generated by the light source into the first end of the light pipe.

In another embodiment, another light pipe assembly is provided. The assembly includes a light pipe, an angled arm, and an optical concentrator. The light pipe is linearly elongated between opposite first and second ends along a longitudinal axis and is formed from a light transmissive material. The angled arm is joined with the first end of the light pipe and is formed from a light transmissive material. The angled arm is elongated along a secondary axis that is oriented at an oblique angle with respect to the longitudinal axis. The optical concentrator is joined to the angled arm and is formed from a light transmissive material that extends between an end section and a coupling end. The end section is configured to accept light generated by a light source. The coupling end is connected to the angled arm. The optical concentrator focuses the light generated by the light source into the angled arm and the angled arm conveys the light into the light pipe along one or more directions that are obliquely oriented with respect to the longitudinal axis.

BRIEF DESCRIPTION OF THE DRAWINGS

FIG. 6 is a perspective view of an optical concentrator in accordance with another embodiment of the present disclosure.

FIG. 7 is a schematic diagram of the optical concentrator shown in FIG. 6 and the light pipe shown in FIG. 1 in accordance with one embodiment of the present disclosure.

DETAILED DESCRIPTION OF THE INVENTION

Figure 1:
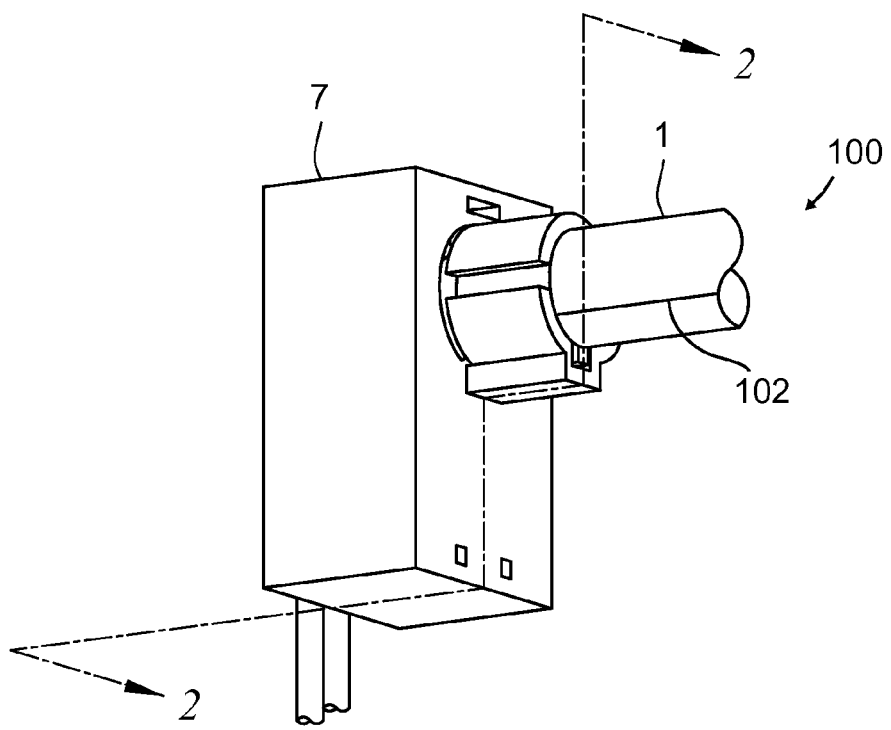
FIG. 1 is a perspective view of a light pipe assembly installed in a mounting assembly in accordance with one embodiment of the present disclosure.
Figure 2:
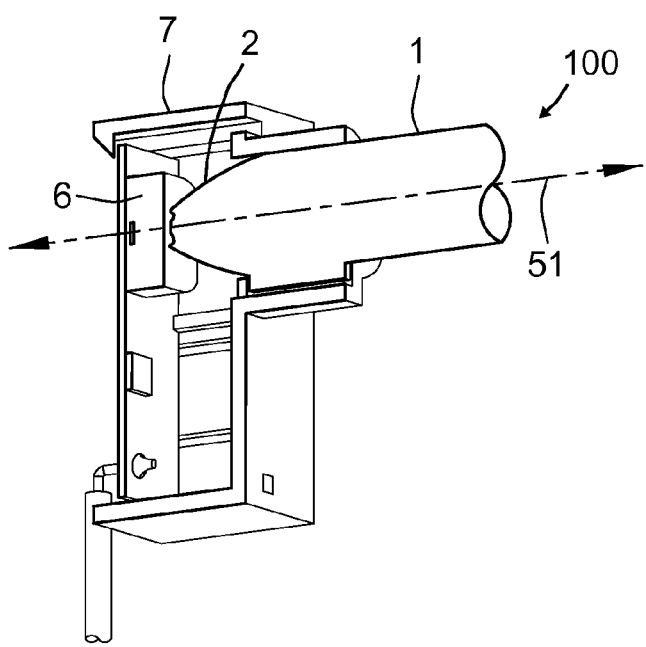
FIG. 2 is a cross-sectional view of the light pipe assembly and mounting assembly along line 2-2 in FIG. 1.

FIG. 1 is a perspective view of a light pipe assembly 100 installed in a mounting assembly 7 in accordance with one embodiment of the present disclosure. FIG. 2 is a cross-sectional view of the light pipe assembly 100 and the mounting assembly 7 taken along line 2-2 in FIG. 1. The light pipe assembly 100 includes a light pipe 1 and an optical concentrator 2. A portion of the light pipe assembly 100 may be disposed within the mounting assembly 7 along with a light source 6 (shown in FIG. 2). The light source 6 is a device or apparatus capable of generating or emitting light. By way of non-limiting example only, the light source 6 may be one or more LEDs. The light source 6 is mounted within the mounting assembly 7.

The light pipe 1 is an elongated body that is oriented along a longitudinal axis 51 (shown in FIG. 2). The light pipe 1 and the light source 6 are mounted to the mounting assembly 7 such that the light source 6 is aligned with the longitudinal axis 51. For example, the light source 6 may be aligned with the longitudinal axis 51 such that the light source 6 emits light generally along an optical axis 400 (shown in FIG. 4) that is parallel to or coextensive with the longitudinal axis 51. The light pipe 1 may include a layer 102 of reflective material. In the illustrated embodiment, the layer 102 is elongated along the longitudinal axis 51. By way of example only, the layer 102 may be over-molded onto the light pipe 1, formed with the light pipe 1, such as by co-extruding the light pipe 1 with the layer 102, or painted onto the light pipe 1. At least some of the light propagating through the light pipe 1 impinges on the layer 102. The impinging light exits or emanates from the light pipe 1.

Figure 3:
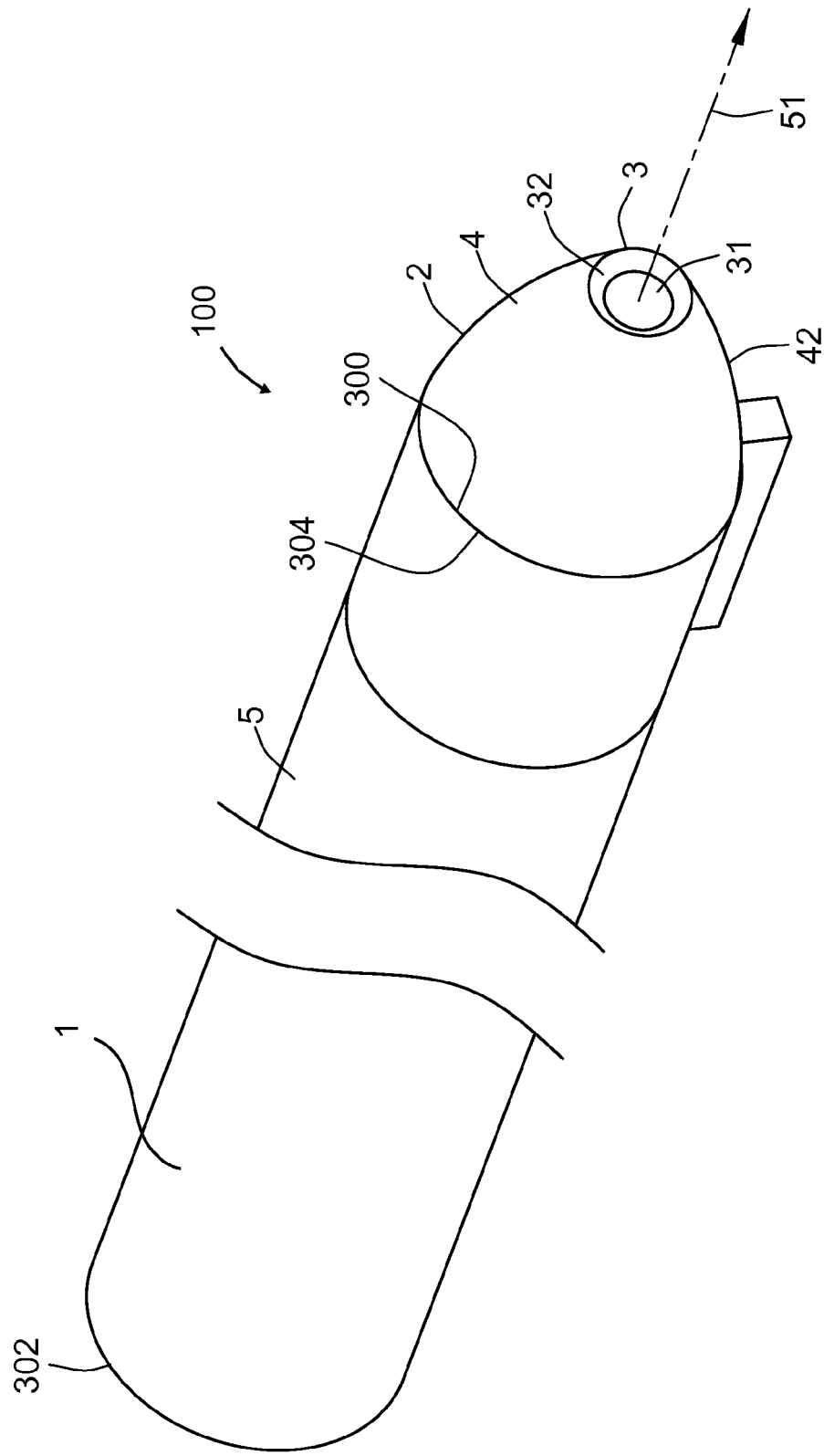
FIG. 3 is a perspective view of the light pipe assembly shown in FIG. 1 in accordance with one embodiment of the present disclosure.
Figure 4:
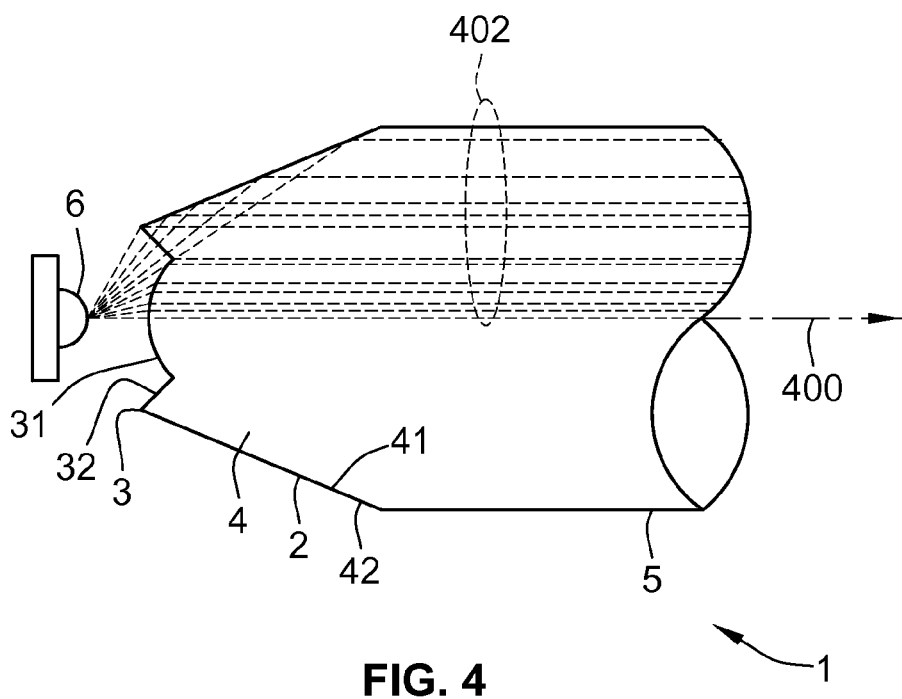
FIG. 4 is a schematic illustration of the light pipe assembly shown in FIG. 3 in accordance with one embodiment of the present disclosure.

FIG. 3 is a perspective view of the light pipe assembly 100 in accordance with one embodiment of the present disclosure. FIG. 4 is a schematic illustration of the light pipe assembly 100. The light pipe 1 is elongated between opposite first and second ends 300, 302 along the longitudinal axis 51. The light pipe 1 includes, or is formed from, a light transmissive material, such as acrylic or polycarbonate. The light pipe 1 may be a solid body formed from the light transmissive material. The material of the light pipe 1 permits light generated by the light source 6 to propagate through the light pipe 1 along a length of the light pipe 1. As shown in FIGS. 3 and 4, one embodiment of the light pipe 1 includes an optical concentrator, or lens portion, 2 and an extended cylindrical section 5. The extended cylindrical section 5 may have an approximate cylindrical shape or an approximate circular cross-sectional shape that extends from the first end 300 to the second end 302. Alternatively, the extended cylindrical section 5 may have a different shape.

The optical concentrator 2 is joined to the first end 300 of the light pipe 1. The optical concentrator 2 may alternatively be referred to as an optical concentrator, collimator, refractor, reflector, combination refractor/reflector, and the like. The optical concentrator receives light generated by the light source 6 and concentrates or focuses the light into the light pipe 1. For example, the optical concentrator 2 may refract and/or reflect light generated by the light source 6 to focus the light toward a focal point located within the light pipe 1. The optical concentrator 2 may focus the light to reduce the amount of light that is lost or does not enter into the light pipe 1. As a result, a relatively greater amount of light enters into the light pipe 1 from the light source 6. For example, a greater luminous flux or energy of light may enter the light pipe 1 from the light source 6 relative to a light pipe assembly that does not include the optical concentrator 2. The increased amount of light entering the light pipe 1 may cause more light to emanate from the light pipe 1 along the length of the light pipe 1. In one embodiment, the optical concentrator 2 may focus the light into the light pipe 1 such that the amount of light emanating from the light pipe 1 is more consistent along the length of the light pipe 1 relative to a light pipe assembly that does not include an optical concentrator. The optical concentrator 2 includes, or is formed from, a light transmissive material, such as acrylic or polycarbonate. In one embodiment, the optical concentrator 2 is integral with the light pipe 1. For example, the optical concentrator 2 and extended cylindrical section 5 may be formed as a unitary body. Alternatively, the optical concentrator is separate from the light pipe 1.

The optical concentrator 2 extends between opposite first and second ends 3, 304. The first end 3 may be referred to as an end section while the second end 304 may be referred to as a coupling end. The coupling end 304 is joined with the end 300 of the light pipe 1. The end section 3 is an outer end of the optical concentrator that is exposed to the light source 6. For example, the end section 3 may include a recess, such as an inner convex surface 31, that at least partially receives the light source 6 into the optical concentrator. The end section 3 may alternatively be referred to as a receiving end of the optical concentrator. The end section 3 includes an outer spherical surface 32 that surrounds a periphery of the inner convex surface 31. Alternatively, the end section 3 may have a different shape. The optical concentrator includes an outer shaped section 4 that is coupled with the end section 3. The outer shaped section 4 includes a shaped exterior surface 42 that may have a variety of shapes, such as a parabolic or elliptical shape. In the illustrated embodiment, the exterior surface 42 has the approximate shape of a three-dimensional parabola with the vertex of the parabola removed. For example, exterior surface 42 may have a shape of a three-dimensional object that is encompassed by a two-dimensional parabola swept or moved in a third dimension. In one embodiment, the vertex of the parabola that would otherwise be located at or near the end section 3 may be removed from the shape of the exterior surface 42. The remainder of the exterior surface 42 extends in a parabolic shape to the light pipe 1.

Figure 5:
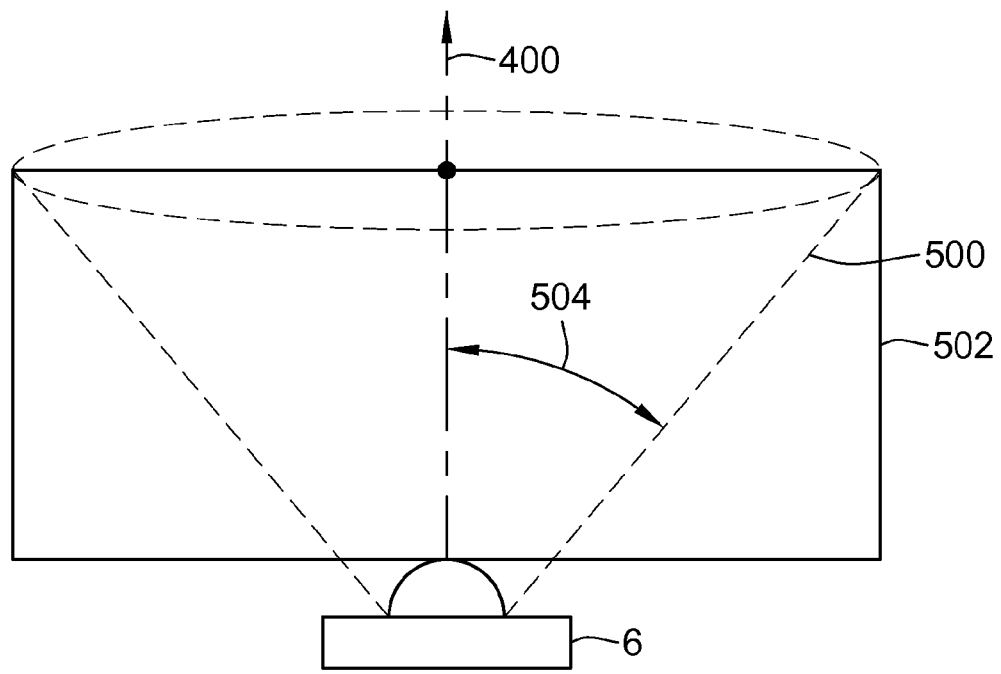
FIG. 5 is a schematic illustrate of a light source shown in FIG. 2 in accordance with one embodiment of the present disclosure.

FIG. 5 is a schematic illustration of the light source 6 in accordance with one embodiment of the present disclosure. FIG. 5 includes an idealized representation of the light source 6 and the light emitted from the light source 6. The light source 6 emits light generally in the direction of the optical axis 400. For example, the optical axis 400 may represent a center of the distribution of light emitted by the light source 6. The light source 6 emits light in a variety of directions. The sum of the directions in which light is directed defines a cone 500. A viewing angle 504 of the spread or distribution of the light may be measured in a two-dimensional plane 502 that extends through the cone 500 and that includes the optical axis 400. The viewing angle 504 represents the spread or distribution of the light emanating from the light source 6. For example, the viewing angle 504 may be a zenith angle of the generated light. Light that is emitted across a larger viewing angle 504 will be more spread out and distributed over a larger volume of space than light that is emitted over a smaller viewing angle 504. In one embodiment, the viewing angle 504 is one half of the angle subtended in the plane 502 by the light having an intensity that is at least 50% of the maximum intensity of the light emitted by the light source 6. Alternatively, the viewing angle 504 may be one half of the angle subtended in the plane 502 in which at least 90% of the total energy of the emitted light is directed. In another example, the viewing angle 504 represents one half of the angle within the plane 502 in which at least a different minimum percentage of the total energy of the emitted light is directed. The minimum percentage may be 80%, 70%, 50%, and the like.

Returning to the discussion of the light pipe 1 shown in FIG. 4, light that is generated by the light source 6 is received into the optical concentrator 2 through the end section 3. The light source 6 generates the light generally along the optical axis 400 shown in FIG. 4. The light is represented by lines 402. Approximately half of the light is shown emanating from the light source 6 in order to more clearly illustrate the optical concentrator 2. Light rays transmitted from the light source 6 at a shallow angle encounter the inner convex surface 31. For example, the light that emanates from the light source 6 at viewing angles 504 (shown in FIG. 5) that are less than a predetermined threshold pass through the inner convex surface 31 of the optical concentrator 2. The light may be refracted by the optical concentrator 2 at the inner convex surface 31 and be collimated along directions that are approximately parallel to the optical axis 400 and/or the longitudinal axis 51 (shown in FIG. 2). Light that emanates from the light source 6 at greater viewing angles 504 do not pass through the inner convex surface 31. For example, the light transmitted at greater viewing angles 504 may encounter the outer spherical surface 32. This light may be reflected by an inside surface 41 of the optical concentrator 2. For example, due to the difference in indices of refraction between the optical concentrator 2 and the atmosphere surrounding the optical concentrator 2, at least some of the light may be reflected by the inside surface 41 due to total internal reflection.

The refracted light and the reflected light propagate through the optical concentrator 2 to the light pipe 1. The light is transmitted along the extended cylindrical section 5 of the light pipe 1 in a direction generally parallel to the longitudinal axis 51 and/or optical axis 400. As shown in FIG. 4, the refracted light that passes through the interface between the atmosphere and the inner convex surface 31 and the reflected light that is reflected by the inside surface 41 are approximately parallel to one another and collimated by the optical concentrator 2 to provide more consistent light along the length of the light pipe 1. Also as shown in FIG. 4, the optical concentrator 2 focuses the light generated by the light source 6. The optical concentrator 2 reflects and refracts the light such that the viewing angle 504 (shown in FIG. 5) over which the light propagates is reduced. For example, the light diverges along a relatively large viewing angle 504 from the light source 6 until the light enters the optical concentrator 2. The optical concentrator 2 collimates the light such that the viewing angle 504 subtended by the light within the light pipe 1 is reduced relative to the initial viewing angle 504 of the light when the light emanates from the light source 6.

FIG. 6 is a perspective view of an optical concentrator 600 in accordance with one embodiment of the present disclosure. The optical concentrator 600 may be similar to the optical concentrator 2 (shown in FIG. 2). For example, the optical concentrator 600 may receive light generated by the light source 6 (shown in FIG. 2) and focus the light into a light pipe such as the light pipe 1 (shown in FIG. 1). The optical concentrator 600 may be joined to the light pipe 1. For example, the optical concentrator 600 may be coupled with the end 300 (shown in FIG. 3) of the light pipe 1 such that the optical concentrator 600 focuses the light into the end 300.

The optical concentrator 600 in the illustrated embodiment has an exterior surface 602 that has an ellipsoidal shape. For example, the exterior surface 602 may have a shape that approximates an ellipsoid extending between a receiving end 604 and a coupling end 606. The receiving end 604 includes a recess 608 that accepts the light source 6 (shown in FIG. 2). The coupling end 606 is approximately flat and may be joined to the end 300 (shown in FIG. 3) of the light pipe 1 (shown in FIG. 1). The ellipsoidal shape of the optical concentrator 600 is elongated along a major axis 610. Two foci 612, 614 may be located along the major axis 610 and may be defined by the ellipsoidal shape of the concentrator 600. The foci 612, 614 may represent the focus points of an ellipse defined by a cross-section of the exterior surface 602 in a two-dimensional plane that includes the major axis 610. For example, the foci 612, 614 may be points along the major axis 610 that are located such that the sum of the distances from a point on the exterior surface 602 to each of the foci 612, 614 is approximately constant over several or all locations of the exterior surface 602. In one embodiment, the recess 608 extends sufficiently far into the optical concentrator 600 such that the light source 6 (shown in FIG. 2) may be disposed at approximately the same location as the focus 612.

FIG. 7 is a schematic diagram of the optical concentrator 600 and the light pipe 1 in accordance with one embodiment of the present disclosure. A light source 700 that is similar to the light source 6 (shown in FIG. 2) is received into the receiving end 604 of the optical concentrator 600. Light that is generated by the light source 700 along an optical axis 706 are represented by lines 702. As shown in FIG. 7, the light propagates from the light source 700 and into the optical concentrator 600. As described above, the light emanates from the light source 700 along a cone 500 (shown in FIG. 5) that is bounded by an initial viewing angle 504 (shown in FIG. 5). Some of the light may strike the interface between the optical concentrator 600 and the atmosphere surrounding the optical concentrator 600. Depending on the angle at which the light strikes the interface and indices of refraction of the concentrator 600 and the atmosphere, the light may be internally reflected away from the interface and retained in the concentrator 600. As the light is internally reflected, the light may propagate along the length of the light pipe 1. Some of the light may strike the exterior surface of the light pipe 1 such that the light emanates from the light pipe 1, as shown in FIG. 7.

The light is focused by the concentrator 600 into the light pipe 1. The concentrator 600 may focus the light toward a focal point 710 that is located within the light pipe 1. For example, the concentrator 600 may direct the diverging rays of light emanating from the light source 700 toward the focal point 710. Alternatively, the focal point 710 may be located in another position, such as at the interface between the concentrator 600 and the light pipe 1, outside of the concentrator 600 and/or light pipe 1, within the concentrator 600, and the like. As shown in FIG. 7, the light is focused, or concentrated, by the optical concentrator 600 such that the distribution of light is reduced. As described above, the light diverges from the light source 700 along a cone that is bounded or defined by an initial viewing angle 708. At least some of the light is internally reflected by the concentrator 600 such that the light exits or emanates from the concentrator 600 into the end 300 of the light pipe 1. For example, the rounded exterior surface 602 of the may internally reflect the light and focus the light toward the light pipe 1. The light may enter into the light pipe 1 within a cone that is bounded or defined by a focused viewing angle 704. As shown in FIG. 7, the focused viewing angle 704 is smaller than the initial viewing angle 708. For example, the viewing angle 708 of the light as the light emanates from the light source 700 may be reduced by the concentrator 600 to a smaller viewing angle 708 at the interface between the concentrator 600 and the end 300 of the light pipe 1. The reduced viewing angle 704 of the light as the light enters the light pipe 1 may increase the ratio or percentage of light generated by the light source 700 that is received into the light pipe 1. For example, the light may be collected and concentrated by the concentrator 600 such that distribution of light may be reduced to prevent light from exiting from the light pipe 1.

Figure 8:
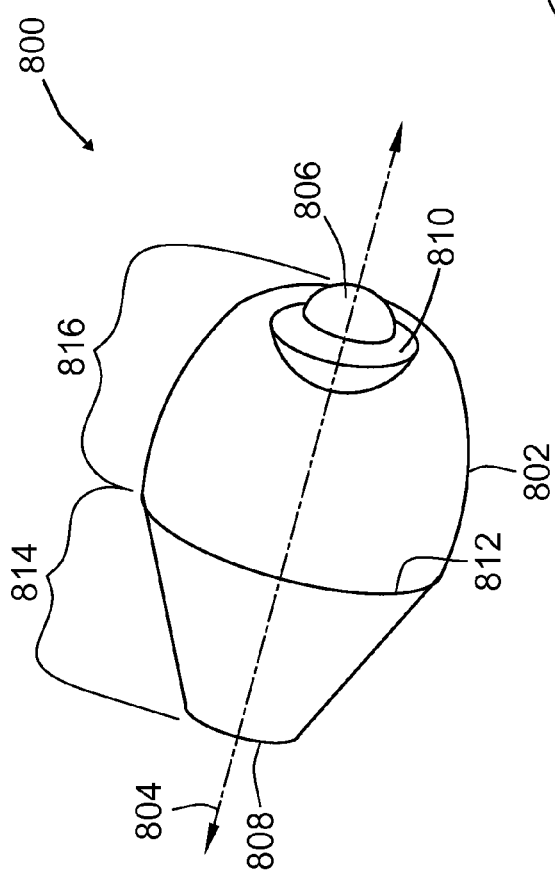
FIG. 8 is a perspective view of an optical concentrator in accordance with another embodiment of the present disclosure.

FIG. 8 is a perspective view of an optical concentrator 800 in accordance with another embodiment of the present disclosure. The optical concentrator 800 may be similar to the optical concentrator 600 (shown in FIG. 6) or the optical concentrator 2 (shown in FIG. 2). For example, the optical concentrator 800 may receive light generated by the light source 6 (shown in FIG. 2) and focus the light into a light pipe such as the light pipe 1 (shown in FIG. 1). The optical concentrator 800 may be joined to the light pipe 1. For example, the optical concentrator 800 may be coupled with the end 300 (shown in FIG. 3) of the light pipe 1 such that the optical concentrator 800 focuses the light from the light source 6 into the end 300.

The optical concentrator 800 in the illustrated embodiment has an exterior surface 802 that has an ellipsoidal shape and a conical shape. For example, the exterior surface 802 may be elongated along a major axis 804 between a receiving end 806 and a coupling end 808. The exterior surface 802 has a cone portion 814 and an ellipsoid portion 816 that meet at an interface 812 between the ends 806, 808. The cone portion 814 has a shape that approximates a cone with the tip of the cone removed. The cone portion 814 extends from the coupling end 808 to the interface 812. The ellipsoid portion 816 has a shape that approximates an ellipsoid and extends from the receiving end 806 to the interface 812. The receiving end 806 includes a recess 810 that accepts the light source 6 (shown in FIG. 2). The coupling end 808 is approximately flat and may be joined to the end 300 (shown in FIG. 3) of the light pipe 1 (shown in FIG. 1).

Similar to the optical concentrator 600 (shown in FIG. 6) and the optical concentrator 2 (shown in FIG. 2), the optical concentrator 800 receives light from the light source 6 (shown in FIG. 2) through the receiving end 806. The light is initially transmitted into the concentrator 800 along an initial viewing angle that is similar to the initial viewing angle 708 (shown in FIG. 7). At least some of the light that strikes the interfaces between the concentrator 800 and the surrounding atmosphere is internally reflected, as described above. The rounded shape of the ellipsoid portion 816 may internally reflect the light toward the cone portion 814.

As shown in FIG. 8, the exterior surface 802 converges toward the major axis 804 in the cone portion 814 such that the exterior surface 802 is closer to the major axis 804 at the coupling end 808 than at the interface 812. This convergence of the exterior surface 802 toward the major axis 804 may further focus the light propagating through the concentrator 800. For example, the light is focused by the concentrator 800 into the light pipe 1 (shown in FIG. 1) at the interface between the concentrator 800 and the end 300 of the light pipe 1. The initial viewing angle of the light that is received in the ellipsoid portion 816 may be focused by the concentrator 800 such that the focused viewing angle of the light that exits the coupling end 808 and enters the light pipe 1 is a smaller angle than the focused viewing angle would have been if the cone portion 814 had an ellipsoidal shape. The convergence of the exterior surface 802 toward the major axis 804 may reflect the light in a tighter distribution or cone along the major axis 804.

Figure 9:
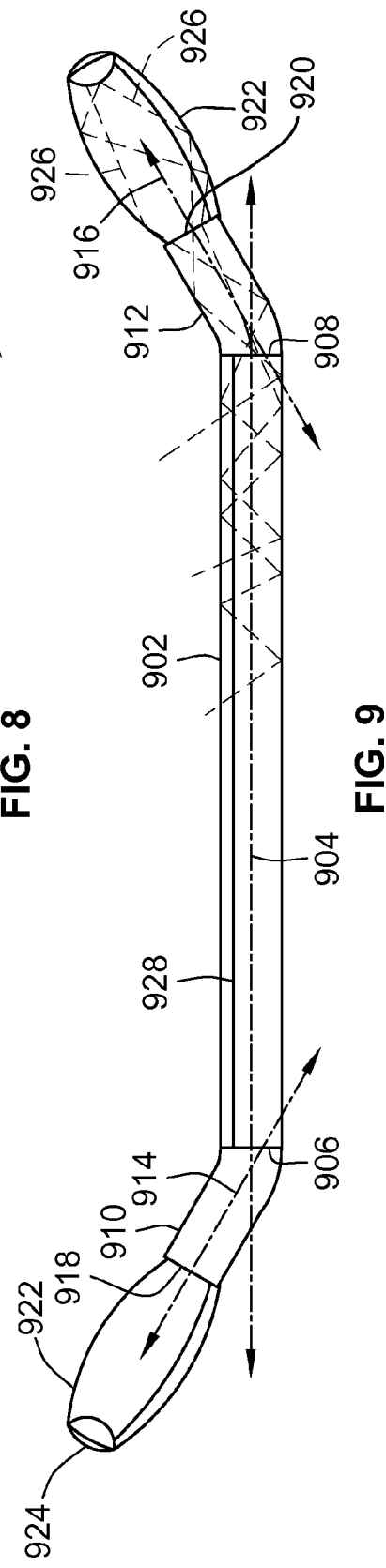
FIG. 9 is a perspective view of a light pipe assembly in accordance with another embodiment of the present disclosure.

FIG. 9 is a perspective view of a light pipe assembly 900 in accordance with another embodiment of the present disclosure. The light pipe assembly 900 may be similar to the light pipe assembly 100 (shown in FIG. 1). For example, the light pipe assembly 900 includes a light pipe 902 that includes, or is formed from, a light transmissive material that permits light to propagate along a length of the light pipe 902. The light pipe 902 is elongated along a longitudinal axis 904. In the illustrated embodiment, the light pipe 902 is a body that linearly extends along the longitudinal axis 904 between opposite ends 906, 908. The light pipe 902 includes a layer 928 of reflective material. In the illustrated embodiment, the layer 928 is elongated along the longitudinal axis 904. By way of example only, the layer 928 may be over-molded onto the light pipe 902, formed with the light pipe 902, such as by co-extruding the light pipe 902 with the layer 928, or painted onto the light pipe 902. At least some of the light propagating through the light pipe 902 impinges on the layer 928. The impinging light exits or emanates from the light pipe 902.

The light pipe 902 includes angled arms 910, 912 joined to the ends 906, 908. The angled arms 910, 912 may be extensions of the light pipe 902 that are oriented at angles with respect to one another and with the light pipe 902. For example, the arms 910, 912 may be formed with the light pipe 902 as a single, unitary body. The arms 910, 912 are elongated along corresponding secondary axes 914, 916. As shown in FIG. 9, the secondary axes 914, 916 are oriented at oblique angles with respect to the longitudinal axis 904 of the light pipe 902. The angled arms 910, 912 extend from the ends 906, 908 of the light pipe 902 to outer first and second ends 918, 920. The outer first and second ends 918, 920 are coupled with optical concentrators 922. The optical concentrators 922 may be one or more of the optical concentrator 2 (shown in FIG. 2) and the optical concentrators 600 (shown in FIG. 6), 800 (shown in FIG. 8). As shown in FIG. 9, the major axes 610 (shown in FIG. 6), 804 (shown in FIG. 8) of the optical concentrators 600, 800 may be oriented at oblique angles with respect to the longitudinal axis 904 of the light pipe 902 and may be parallel to, or coextensive with, the secondary axes 914, 916 of the arms 910, 912. By way of example only, the angle between the major axes 610, 804 and the longitudinal axis 904 may be approximately 17.5, 20.0, 22.5, 25.0, 27.5, 30.0, or 35.0 degrees, although a different angle also may be used. The optical concentrators 922 joined to the different arms 910, 912 may differ from one another. The concentrators 922 may be integral with the arms 910, 912 such that the concentrators 922 and the arms 910, 912 form unitary bodies. Alternatively, the concentrators 922 and arms 910, 912 may be separate bodies.

As described above, light sources 924 may be disposed at least partially within the optical concentrators 922 to generate light toward the optical concentrators 922. At least some of the light is represented by lines 926. The light emanates from the light sources 924 and propagates through the concentrators 922. The concentrators 922 focus the light such that the divergence of the light is reduced and is focused toward the light pipe 902. The light passes through the concentrators 922 and enters the arms 910, 912 through the interfaces between the concentrators 922 and the outer first and second 918, 920. The light continues to propagate through the arms 910, 912 and into the light pipe 902 through the ends 906, 908. Because the arms 910, 912 are obliquely angled with respect to the light pipe 902, at least some of the light that is focused by the concentrators 922 enters the light pipe 902 in directions that are oriented at oblique angles with respect to the longitudinal axis 904. For example, the concentrators 922 may focus or converge the rays of light emanated from the light sources 924 such that the focused viewing angles of the light exiting the concentrators 922 and entering into the arms 910, 912 is smaller than the initial viewing angles of the light emanating from the light sources 924. This focused light propagates through the arms 910, 912. Some of the light may be internally reflected in the arms 910, 912 as the light travels toward the light pipe 902.

The focused light enters the light pipe 902 from the arms 910, 912 in directions that are angled with respect to the longitudinal axis 904. The focused light is received into the light pipe 902 at obliquely oriented angles. The angles at which some of the light is received may cause the light to internally reflect within the light pipe 902 such that the light travels along the length of the light pipe 902 within the light pipe 902. But, the oblique angles at which some of the light enters the light pipe 902 may cause some of the light to scatter within the light pipe 902 and exit the light pipe 902. For example, some of the light may strike the interface between the light pipe 902 and the atmosphere surrounding the light pipe 902 such that the light exits the light pipe 902 and is not internally reflected. The focusing of the light by the concentrators 922 may increase the amount of light that is passed into the light pipe 902. The angles at which the arms 910, 912 are oriented may cause this light to scatter once the light is inside the light pipe 902 and emanate from the light pipe 902. The focused light that is then scattered within the light pipe 902 may cause a more even distribution of light to emanate from the light pipe 902 throughout the length of the light pipe 902 and result in a brighter or more noticeable light.

Figure 10:
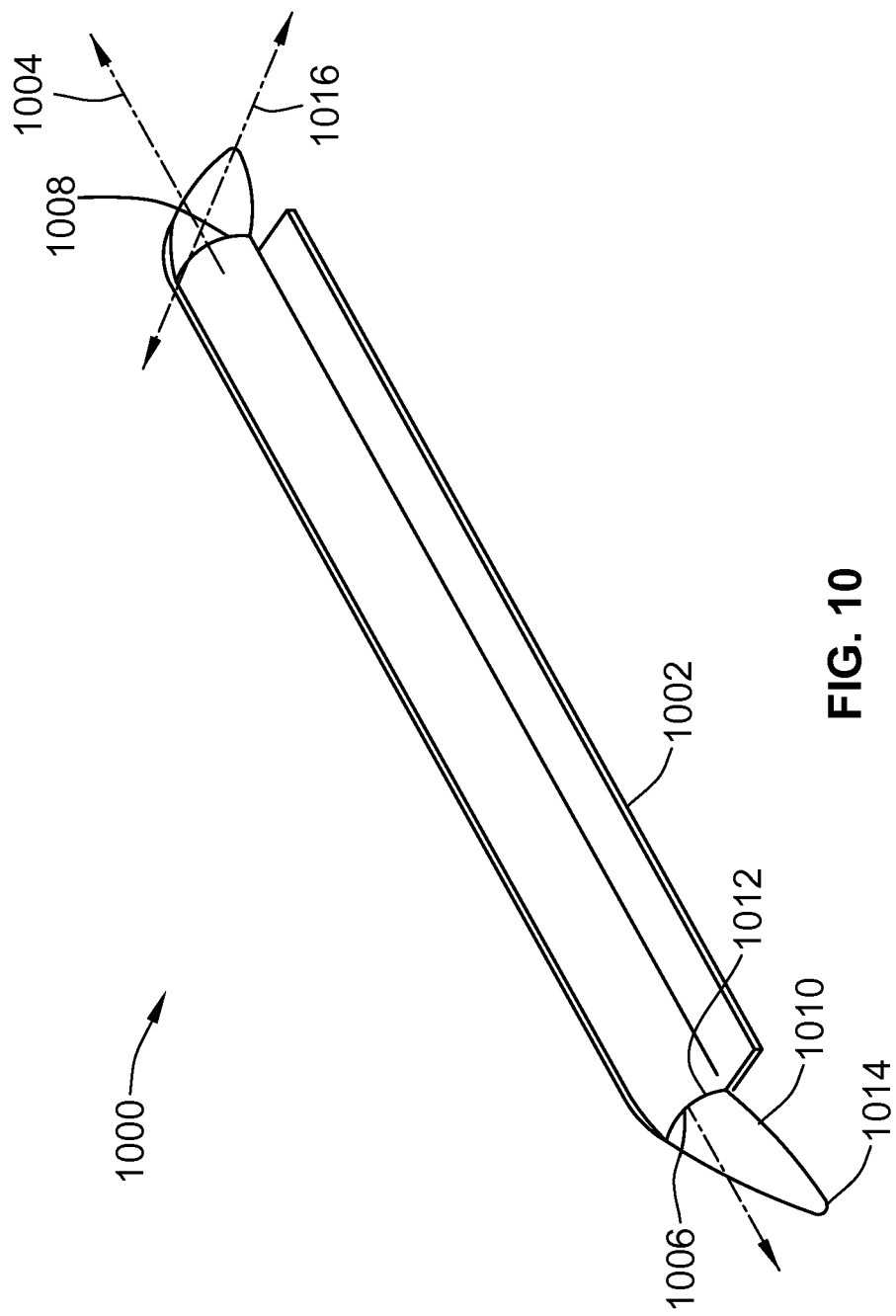
FIG. 10 is a perspective view of a light pipe assembly in accordance with another embodiment of the present disclosure.

FIG. 10 is a perspective view of a light pipe assembly 1000 in accordance with another embodiment of the present disclosure. The light pipe assembly 1000 may be similar to the light pipe assembly 100 (shown in FIG. 1) and/or the light pipe assembly 900 (shown in FIG. 9). For example, the light pipe assembly 1000 includes a light pipe 1002 that includes, or is formed from, a light transmissive material that permits light to propagate along a length of the light pipe 1002. The light pipe 1002 is elongated along a longitudinal axis 1004. In the illustrated embodiment, the light pipe 1002 is a body that linearly extends along the longitudinal axis 1004 between opposite ends 1006, 1008. The light pipe 1002 includes an approximately flat portion 1112 (shown in FIG. 11). The flat portion 1112 may include a layer of reflective material. For example, the flat portion 1112 may include an elongated layer of reflective material that is similar to the layer 928 (shown in FIG. 9). As described above, at least some of the light propagating through the light pipe 1002 that strikes the layer on the flat portion 1112 may emanate from the light pipe 1002.

In contrast to the light pipe assembly 900, the light pipe assembly 1000 does not include arms disposed at angles with respect to the light pipe 1000. Instead, the light pipe assembly 900 includes optical concentrators 1010 that are angled with respect to the light pipe 1002. The optical concentrators 1010 are elongated between a coupling end 1012 and a receiving end 1014 along secondary axes 1016. The secondary axes 1016 are oriented at oblique angles with respect to the longitudinal axis 1004.

As described below, the optical concentrators 1010 include light sources (not shown) that are at least partially disposed within the receiving ends 1014. The light sources generate light that diverges from the light sources across a cone defined by an initial viewing angle. The light enters into the optical concentrators 1010 and is focused by the concentrators 1010 prior to the light propagating into the light pipe 1002 at the interface between the light pipe 1002 and the concentrators 1010. For example, the concentrators 1010 may focus the light such that the focused viewing angle of the light entering the light pipe 1002 is reduced relative to the initial viewing angle.

Figure 11:
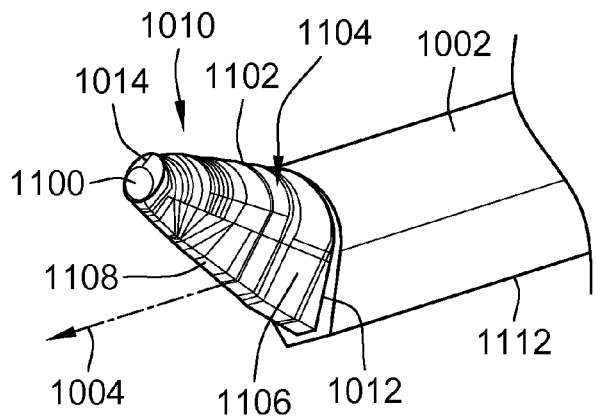
FIG. 11 is a perspective view of an optical concentrator shown in FIG. 10 in accordance with one embodiment of the present disclosure.
Figure 12:
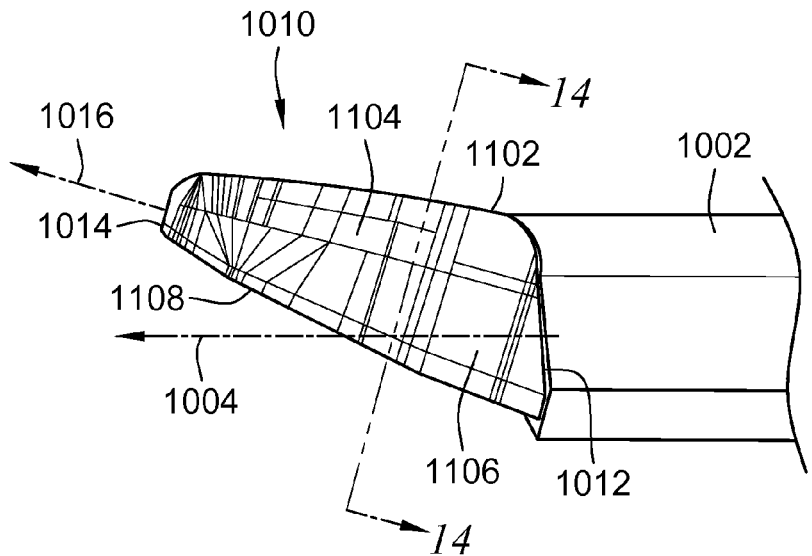
FIG. 12 is another perspective view of the optical concentrator shown in FIG. 10 in accordance with one embodiment of the present disclosure.
Figure 13:
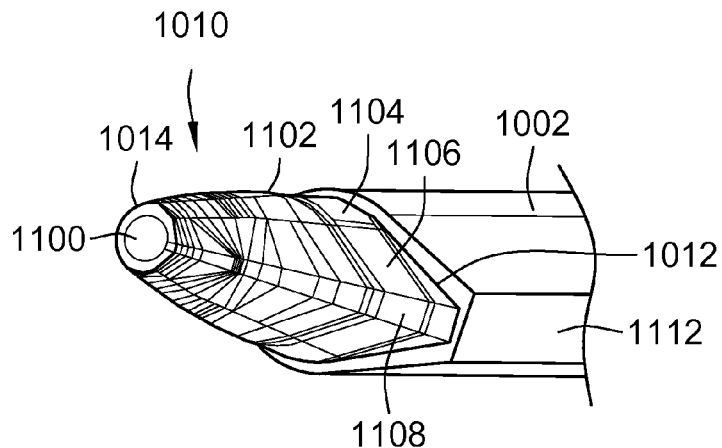
FIG. 13 is another perspective view of the optical concentrator shown in FIG. 10 in accordance with one embodiment of the present disclosure.

FIGS. 11 through 13 are perspective views of one of the optical concentrators 1010 from different perspectives in accordance with one embodiment of the present disclosure. The optical concentrators 1010 include a recess 1100 disposed in the receiving end 1014. The recess 1110 receives a light source (not shown) such as the light source 6 (shown in FIG. 2). The light source generates light that is received into the concentrators 1010 and focused by the concentrators 1010, as described above.

Because the optical concentrators 1010 are elongated in directions that are angled with respect to the light pipe 1002, the light that is focused by the concentrators 1010 enters the light pipe 1002 along one or more directions that are obliquely angled with respect to the longitudinal axis 1004 of the light pipe 1002. As described above, the directions at which some of the light is directed into the light pipe 1002 may cause the light to internally reflect within the light pipe 1002 such that the light travels along the length of the light pipe 1002. But, the oblique angles at which some of the light enters the light pipe 1002 may cause some of the light to scatter within the light pipe 1002 and exit the light pipe 1002. For example, the concentrators 1010 may be angled with respect to the flat portion 1112 of the light pipe 1002. The major axes 1016 of the concentrators 1010 may be disposed at an oblique angle with respect to a two-dimensional plane defined by the flat portion 1112. The angle between the concentrators 1010 and the flat portion 1112 may direct an increased amount of light generated by the light source onto the flat portion 1112. For example, the concentrators 1010 may focus and direct more light generated by the light sources toward the flat portion 1112 relative to concentrators 1010 that are not angled with respect to the flat portion 1112.

Figure 14:
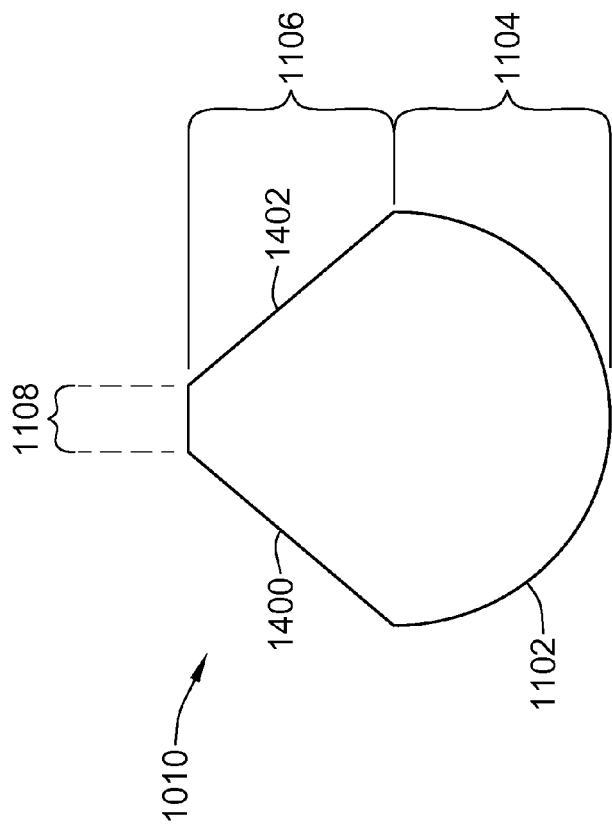
FIG. 14 is a cross-sectional view of the optical concentrator shown in FIG. 10 taken along line 14-14 in FIG. 12.

FIG. 14 is a cross-sectional view of the optical concentrator 1010 taken along line 14-14 in FIG. 12. As shown in FIGS. 11 through 14, the optical concentrators 1010 have an exterior surface 1102 that is formed in a combination of shapes. The illustrated embodiment of the exterior surface 1102 includes a parabolic portion 1104, an angled portion 1106, and a flat portion 1108. The cross-sectional view of the parabolic portion 1104 of the exterior surface 1102 is an approximate parabolic shape in the illustrated embodiment. For example, the parabolic portion 1104 may be formed as a section of a parabola. The parabolic portion 1104 intersects the angled portion 1106 on opposite sides of the concentrator 1010.

The flat portion 1108 includes an approximately flat section of the exterior surface 1102. The plane defined by the flat portion 1108 is approximately parallel to the major axis 1016 in the illustrated embodiment. Alternatively, the plane defined by the flat portion 1108 may be oriented at an oblique angle with respect to the major axis 1016.

The angled portion 1106 also intersects the flat portion 1108 and extends from the flat portion 1108 to the parabolic portion 1104. The angled portion 1106 includes two surfaces 1400, 1402 that are obliquely angled with respect to one another. For example, the angled portion 1106 may represent two approximately flat surfaces that are oriented at oblique angles with respect to one another. The surfaces 1400, 1402 are angled with respect to one another such that the end of the surfaces 1400, 1402 that intersect the flat portion 1108 are closer to one another than the ends of the surfaces 1400, 1402 that intersect the parabolic portion 1104.

The shape of the optical concentrator 1010 is tapered such that the cross-sectional area of the concentrator 1010 changes along the length of the concentrator 1010. For example, the cross-sectional area of the concentrator 1010 in a plane oriented perpendicular to the major axis 1016 and extending through the concentrator 1010 at or near the intersection between the light pipe 1002 and the concentrator 1010 may be larger than the cross-sectional area of the concentrator 1010 in a parallel plane located at or near the receiving end 1014.

The various portions 1104-1108 internally reflect at least a portion of the light that propagates through the optical concentrator 1010. For example, as described above, light that passes through the concentrator 1010 from the receiving end 1014 toward the coupling end 1012 may strike the interface between the exterior surface 1102 within one or more of the portions 1104-1108 and the atmosphere surrounding the concentrator 1010. Depending on the indices of refraction between the concentrator 1010 and the atmosphere, and the angle at which the light strikes the interface between the exterior surface 1102 and the atmosphere, at least some of the light may internally reflect back into the concentrator 1010. The shape of the concentrator 1010 may focus the light into the light pipe 1002 such that the light spans a smaller viewing angle as the light enters the light pipe 1002 than the viewing angle of the light as the light emanates from the light source.

Figure 15:
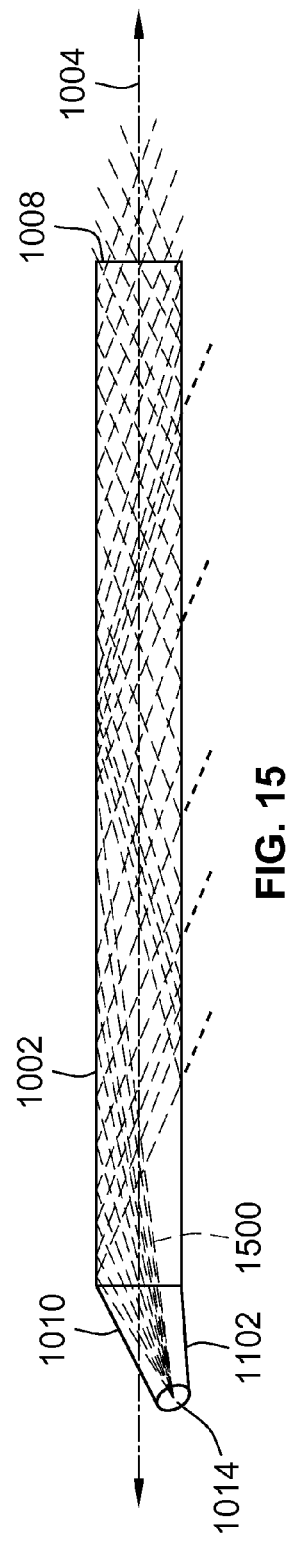
FIG. 15 is a schematic diagram of the optical concentrator shown in FIG. 10 and a light pipe shown in FIG. 10 in accordance with one embodiment of the present disclosure.

FIG. 15 is a schematic diagram of the optical concentrator 1010 and the light pipe 1002 in accordance with one embodiment of the present disclosure. The concentrator 1010 coupled to the end 1008 of the light pipe 1002 is removed in the illustration shown in FIG. 15. Light is directed into the receiving end of the concentrator 1010 by a light source such as the light source 6 (shown in FIG. 2) disposed in the receiving end 1014 of the concentrator 1010. The light is represented by lines 1500 extending and internally reflecting within the concentrator 1010 and the light pipe 1002. As shown in FIG. 15, the light is received by the concentrator 1010 and at least some of the light internally reflects off the interfaces between the exterior surface 1102 and the surrounding atmosphere. The light emanating from the light source diverges along a cone defined by an initial viewing angle. The light may be internally reflected by the exterior surface 1102 within one or more of the parabolic, angled, and flat portions 1104-1108 (shown in FIG. 11) and be generally directed or focused by the concentrator 1010 toward the light pipe 1002. For example, the light may exit the concentrator 1010 along a cone that is defined by a focused viewing angle, as described above. The focused viewing angle of the light exiting the concentrator 1010 and passing into the light pipe 1002 may be smaller than the initial viewing angle of the light emanating from the light source.

As described above, the concentrator 1010 is angled with respect to the light pipe 1002. The angled relationship between the concentrator 1010 and the light pipe 1002 may cause the light that is focused by the concentrator 1010 to enter into the light pipe 1002 at an oblique angle with respect to the longitudinal axis 1004 of the light pipe 1002. As shown in FIG. 15, the light enters the light pipe 1002 at an angle such that a relatively large proportion of the energy or intensity of light is directed toward one side 1502 of the light pipe 1002. The light may internally reflect off of the side 1502 and be directed toward the opposite side 1504 of the light pipe 1002. The light may continue to bounce back and forth between the sides 1502, 1504 along the length of the light pipe 1002, thereby causing an increased amount of light to pass through and reach the opposite end 1008 of the light pipe 1002 relative to light that is not focused by the concentrator 1010 or that is directed into the light pipe 1002 along directions that are parallel to the longitudinal axis 1004. In one embodiment, at least some of the light may strike the interface between the light pipe 1002 and the surrounding atmosphere at an angle that permits the light to exit from the light pipe. The increased amount of light that is focused into the light pipe 1002 may cause the amount of light emanating from the light pipe 1002 to increase and/or be more consistent along the length of the light pipe 1002.

The ability of an optical concentrator such as one or more of the concentrators 2 (shown in FIG. 2), 600 (shown in FIG. 6), 800 (shown in FIG. 8), 922 (shown in FIG. 9), 1010 (shown in FIG. 10) may be quantified using a focusing efficiency. The focusing efficiency may be based on a relation between or among a luminous flux, intensity, or energy of the light emanating from a light source such as the light source 6 (shown in FIG. 2), the luminous flux, intensity, or energy of the light emanating from a light pipe that receives the light from the light source after being focused by an optical concentrator 2, 600, 800, 922, 1010, the material(s) used in the concentrator 2, 600, 800, 922, 1010 and the light pipe, the shape of the concentrator 2, 600, 800, 922, 1010, and/or the focal length or distance of the concentrator 2, 600, 800, 922, 1010. By way of example only, the focusing efficiency may be quantified using a concentrator 2, 600, 800, 922, 1010 joined to one end 300 (shown in FIG. 3) of the light pipe 1 (shown in FIG. 1) with no concentrator 2, 600, 800, 922, 1010 joined to the opposite end 302 (shown in FIG. 1) of the light pipe 1. The total luminous flux emanating from the light source disposed in the concentrator 2, 600, 800, 922, 1010 is measured along with the luminous flux escaping from the end 302 of the light pipe 1. Alternatively, the luminous flux escapting from the end 302 may be measured as the luminous flux passing through a plane oriented perpendicular to the longitudinal axis 51 (shown in FIG. 2) within the light pipe 1. The focusing efficiency may be defined as the ratio of the luminous flux emanating from the end 302 to the luminous flux emanating from the light source.

In one embodiment, the focusing efficiencies for several optical concentrators having an ellipsoidal shape such as one or more of the concentrators 600 (shown in FIG. 6), 922 (shown in FIG. 9) may vary based on one or more of the lengths of the light pipe 1 (shown in FIG. 1) and of the concentrators 600, 922, the shape of the concentrators 600, 922, the material(s) used to form the concentrators 600, 922 and/or light pipe 1, and the focal distance of the concentrators 600, 922. For example, with an ellipsoidal concentrator 600, 922 formed from acrylic and having a length of approximately 35 millimeters, a focal distance of approximately 1.50 millimeters, and a light pipe 1 having a length of approximately 100 millimeters, the focusing efficiency may be approximately 72%. In another example, with the same sized concentrator 600, 922 formed from acrylic, the same sized light pipe 1, and the concentrator 600, 922 having a focal length of approximately 2.00 millimeters, the focusing efficiency may be approximately 85%. In another example, with the same sized concentrator 600, 922 formed from acrylic, the same sized light pipe 1, and the concentrator 600, 922 having a focal length of approximately 2.50 millimeters, the focusing efficiency may be approximately 83%. In another example, with the same sized concentrator 600, 922 formed from a polycarbonate, the same sized light pipe 1, and the concentrator 600, 922 having a focal length of approximately 2.00 millimeters, the focusing efficiency may be approximately 85%.

As described above, the concentrators 2 (shown in FIG. 2), 600 (shown in FIG. 6), 800 (shown in FIG. 8), 922 (shown in FIG. 9), 1010 (shown in FIG. 10) may focus light generated by the light source 6 (shown in FIG. 2) to increase the amount of the light that enters a light pipe such as the light pipe 1 (shown in FIG. 1) relative to light pipes that do not include such an optical concentrator. For example, a greater luminous flux or energy of light may enter the light pipe 1 from the light source 6 relative to a light pipe assembly that does not include an optical concentrator 2, 600, 800, 922, 1010. The increased amount of light entering the light pipe 1 may increase the amount of light emanating from the light pipe 1 along the length of the light pipe 1 and/or may provide a more consistent distribution of light emanating from the light pipe 1 along the length of the light pipe 1. For example, the total luminous flux or total energy of the light emanating from the light pipe 1 may be increased over a light pipe that does not receive light from a concentrator such as one or more of the concentrators 2, 600, 800, 922, 1010. In another example, the distribution of the luminous flux or energy of the light emanating from the light pipe 1 may be more consistent or constant along the length of the light pipe 1 relative to a light pipe that does receive light from a concentrator such as one or more of the concentrators 2, 600, 800, 922, 1010.

Figure 16:
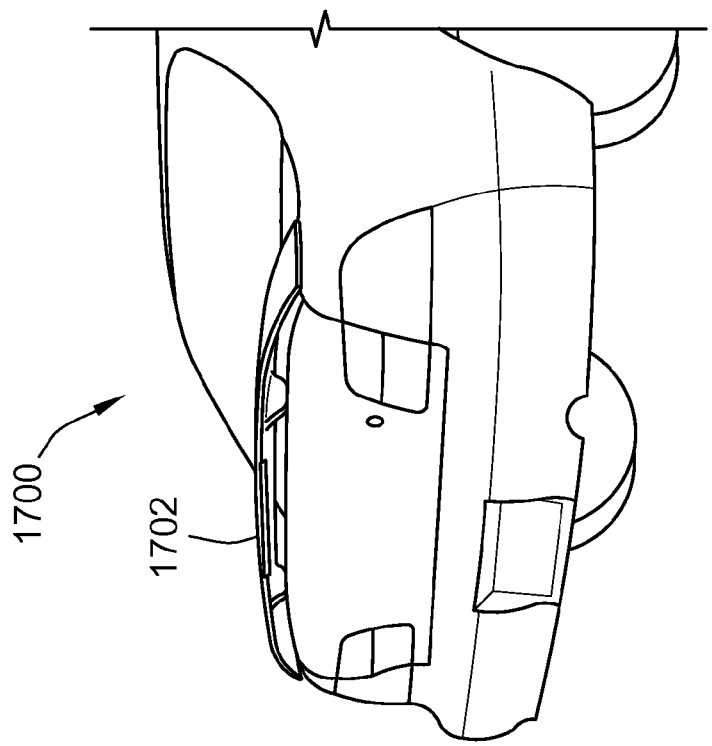
FIG. 16 is a perspective view of a vehicle in accordance with one embodiment of the present disclosure.

FIG. 16 is a perspective view of a vehicle 1700 in accordance with one embodiment of the present disclosure. The vehicle 1700 is an automobile in the illustrated embodiment, but alternatively may be different vehicle, such as a truck, airplane, locomotive, or other device capable of transporting goods and/or people. The vehicle 1700 includes a signal apparatus 1702 disposed on or at the back end of the vehicle 1700. The signal apparatus 1702 is a lighting mechanism that emanates light outward from the apparatus 1702. In the illustrated embodiment, the signal apparatus 1702 is a third brake light, but alternatively may be a dashboard light, a headlight, a rear light, a turn signal, or other component in the vehicle 1700 that projects illuminating light. Alternatively, the signal apparatus 1702 may be used outside of the vehicle 1700, such as in a stoplight, warning light, and the like. The signal apparatus 1702 may include one or more of the optical concentrators 2 (shown in FIG. 2), 600 (shown in FIG. 6), 800 (shown in FIG. 8), 922 (shown in FIG. 9), 1010 (shown in FIG. 10), one or more light pipes such as the light pipe 1 (shown in FIG. 1), and one or more light sources such as the light source 6 (shown in FIG. 2). The concentrators 2, 600, 800, 922, 1010 and light pipe 1 may be used to focus the light generated by the light source 6, as described above, so that the light may project from the signal apparatus 1702 and to signal an event or to illuminate a portion of the vehicle 1700. For example, the signal apparatus 1702 may emit light to warn other drivers that the vehicle 1700 is stopping or backing up, or to illuminate a portion of the dashboard within the vehicle 1700.

Figure 17:
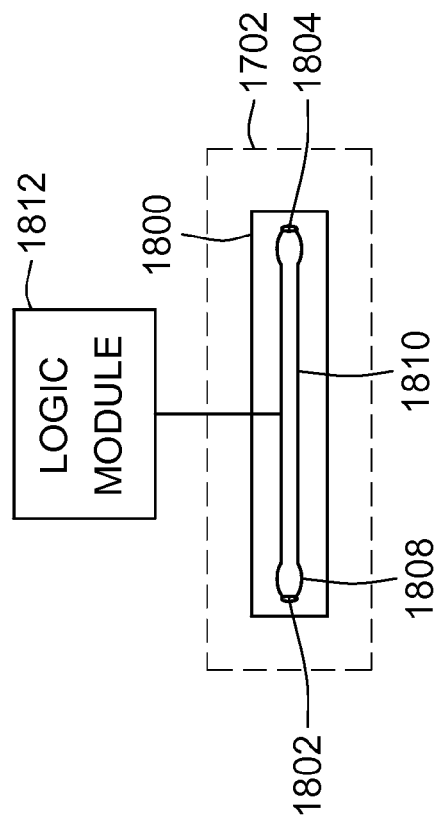
FIG. 17 is a schematic view of a signal apparatus shown in FIG. 16 in accordance with one embodiment of the present disclosure.

FIG. 17 is a schematic view of the signal apparatus 1702 in accordance with one embodiment of the present disclosure. The signal apparatus 1702 includes a housing 1800 formed of a light transmissive material. For example, the housing 1800 may be molded from an acrylic or a polycarbonate that is tinted a color such as red. The housing 1800 may be mounted to the vehicle 1700 (shown in FIG. 16), such as to the rear end of the vehicle 1700. In the illustrated embodiment, two light sources 1802, 1804 are mounted within the housing 1800. The light sources 1802, 1804 may be LEDs, for example. Two optical concentrators 1808 are joined to opposite ends of a light pipe 1810 in the housing 1800. The optical concentrators 1808 may be similar to one or more of the concentrators 2 (shown in FIG. 2), 600 (shown in FIG. 6), 800 (shown in FIG. 8), 922 (shown in FIG. 9), 1010 (shown in FIG. 10). The light pipe 1810 may be similar to the light pipe 1 (shown in FIG. 1). The light sources 1802, 1804 are electronically and logically coupled with a logic module 1812. The logic module 1812 may be a computing or processing device that activates and deactivates the light sources 1802, 1804. For example, the logic module 1812 may be a processor, microprocessor, microcontroller, solid state logic device, and the like, that controls when the light sources 1802, 1804 generate light. While a single light pipe 1810, two light sources 1802, 1804, and two optical concentrators 1808 are shown in FIG. 18, alternatively a different number of one or more of the light pipe 1810, light sources 1802, 1804, and optical concentrators 1808 may be provided.

The logic module 1812 activates the light sources 1802, 1804 and causes the light sources 1804, 1806 to emanate light into the optical concentrators 1808. For example, the logic module 1812 may detect when a brake in the vehicle 1700 (shown in FIG. 16) is depressed, a button or switch is pushed/toggled, and the like and activate or deactivate the light sources 1802, 1804 accordingly. As described above, the concentrators 1808 focus the light emanating from the light sources 1802, 1804 and direct the light into the light pipe 1810. The focused light travels through the light pipe 1810 and may emanate from the light pipe 1810 along the length of the light pipe 1810 to signal others of an event, such as a brake being depressed, or to illuminate an area in the vehicle 1700.

Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §1102, sixth paragraph, unless and until such claim limitations expressly use the phrase "means for" followed by a statement of function void of further structure.

What is claimed is:

1. A light pipe assembly comprising:
a light pipe elongated between opposite first and second ends along a longitudinal axis, the light pipe formed from a light transmissive material; and
an optical concentrator joined to the first end of the light pipe, the optical concentrator including an end section and an opposite coupling end connected to the first end of the light pipe, the end section configured to receive light generated by a light source, the optical concentrator formed from a light transmissive material that conveys light through the optical concentrator, wherein the optical concentrator collimates the light generated by the light source into the first end of the light pipe,
wherein an exterior surface of the optical concentrator includes an ellipsoid shape that is elongated along a major axis,
wherein the exterior surface of the optical concentrator includes a cone shape that extends from the coupling end of the optical concentrator to the ellipsoid shape, and the ellipsoid shape extends from the end section of the optical concentrator to an interface between the cone shape and the ellipsoid shape.

2. The light pipe assembly of claim 1, wherein the optical concentrator collimates the light toward the light pipe and increases a total luminous flux of the light emanating from the light pipe along a length of the light pipe.

3. The light pipe assembly of claim 1, wherein the optical concentrator collimated the light generated by the light source into the first end of the light pipe in one or more directions that are parallel to each other and that are oriented at oblique angles with respect to the longitudinal axis.

4. The light pipe assembly of claim 1, wherein the light from the light source enters the optical concentrator along several different angled directions disposed within a cone that is defined by an initial viewing angle, and the optical concentrator collimates the light along parallel directions contained within a focused viewing angle that is smaller than the initial viewing angle.

5. The light pipe assembly of claim 1, wherein the light pipe includes an angled arm disposed at the first end of the light pipe, the angled arm elongated along a secondary axis that is oriented at an oblique angle with respect to the longitudinal axis, further wherein the optical concentrator is joined to the arm and collimates the light generated by the light source into the angled arm.

6. The light pipe assembly of claim 5, wherein the optical concentrator is elongated between the end section and the coupling end along a major axis, and the major axis is oriented at a parallel relationship with respect to the secondary axis of the angled arm.

7. The light pipe assembly of claim 1, wherein the optical concentrator and the light pipe are a unitary body.

8. The light pipe assembly of claim 1, wherein the exterior surface of the optical concentrator includes a parabolic shape.

9. The light pipe assembly of claim 1, wherein the optical concentrator is elongated between the end section and the coupling end along a major axis, and the major axis is oriented at an oblique angle with respect to the longitudinal axis.

10. The light pipe assembly of claim 1, wherein the optical concentrator is formed from at least one of an acrylic material or a polycarbonate material.

11. The light pipe assembly of claim 1, wherein the optical concentrator has a focusing efficiency of at least approximately 72%.

12. The light pipe assembly of claim 11, wherein the focusing efficiency is a ratio of a luminous flux of light passing through a plane oriented perpendicular to the longitudinal axis within the light pipe and a luminous flux of the light generated by the light source.

* * * * *